(12) United States Patent
Liu et al.

(10) Patent No.: US 10,175,770 B2
(45) Date of Patent: Jan. 8, 2019

(54) PROACTIVE INPUT METHOD EDITOR SWITCHING

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 15/293,127

(22) Filed: Oct. 13, 2016

(65) Prior Publication Data
US 2018/0107283 A1 Apr. 19, 2018

(51) Int. Cl.
*G06F 17/00* (2006.01)
*G06F 3/01* (2006.01)
*G10L 15/26* (2006.01)
*G06F 3/0488* (2013.01)
*G06F 17/22* (2006.01)

(52) U.S. Cl.
CPC .......... *G06F 3/018* (2013.01); *G06F 3/04883* (2013.01); *G06F 17/2223* (2013.01); *G10L 15/26* (2013.01)

(58) Field of Classification Search
CPC ..... G06F 17/289; G06F 17/277; G06F 3/0233
See application file for complete search history.

(56) References Cited

U.S. PATENT DOCUMENTS

| | | | |
|---|---|---|---|
| 6,573,844 B1 | 6/2003 | Venolia et al. | |
| 7,080,002 B1 | 7/2006 | Kim | |
| 7,263,658 B2 | 8/2007 | Chou | |
| 7,370,275 B2 | 5/2008 | Haluptzok et al. | |
| 7,562,007 B2 | 7/2009 | Hwang | |
| 8,818,791 B2 | 8/2014 | Xiao et al. | |
| 9,002,699 B2 | 4/2015 | Qin | |
| 9,026,426 B2 | 5/2015 | Wu et al. | |
| 9,063,636 B2 | 6/2015 | Deng et al. | |
| 2010/0169770 A1 | 7/2010 | Hong et al. | |
| 2012/0110459 A1 | 5/2012 | Drory et al. | |
| 2012/0226490 A1 | 9/2012 | Mashiah | |
| 2012/0296627 A1* | 11/2012 | Suzuki .................. | G06F 17/27 704/2 |

(Continued)

OTHER PUBLICATIONS

Sakkos, et al.; "Anima: Adaptive Personalized Software Keyboard", submitted Jan. 23, 2015, revised Aug. 29, 2015, 4 pages. <https://arxiv.org/abs/1501.05696>.

*Primary Examiner* — Andrew T McIntosh
(74) *Attorney, Agent, or Firm* — Patterson + Sheridan, LLP

(57) ABSTRACT

Method and apparatus for proactive IME switching are provided. Embodiments receive a first input using a first input method editor (IME) of a plurality of IMEs. A first string corresponding to the first input is determined using the first IME. Upon receiving an indication that the first string is incorrect, a second IME of the plurality of IMEs is selected based on a mapping between a context of the first input and the second IME, wherein the context of the first input comprises: a first application that the first input was intended for; the first input; and a series of strings determined just before receiving the first input. Finally, a second string for a second input is determined using the second IME.

20 Claims, 4 Drawing Sheets

(56) References Cited

U.S. PATENT DOCUMENTS

| | | | |
|---|---|---|---|
| 2013/0159920 A1* | 6/2013 | Scott | G06F 17/3087 |
| | | | 715/780 |
| 2014/0052725 A1 | 2/2014 | Lee | |
| 2014/0267047 A1* | 9/2014 | Paddon | G06F 3/0233 |
| | | | 345/168 |
| 2015/0161099 A1* | 6/2015 | Lee | G06F 17/275 |
| | | | 345/171 |

* cited by examiner

PROACTIVE INPUT METHOD EDITOR SWITCHING

BACKGROUND

The present invention relates to the field of input devices, and more specifically, to automatically and proactively switching between input method editors.

Written languages using large numbers of characters that represent words or morphemes, sometimes referred to as ideographic characters, face complication when trying to provide input from standard computing input devices, such as a standard keyboard. Some languages, such as Mandarin Chinese, may have thousands of characters that can be used in written expression. Phonetic Romanization has been used in which the phonetic pronunciation of the character is represented in Romanized or Latinized characters that are produced using the American Standard Code for Information Interchange (ASCII). Romanization or Latinization is the conversion of writing from a different writing system to the Roman (Latin) script. Methods of Romanization of written text include transliteration, converting text from one written type of script to another, and transcription, which is the systematic representation of language in written form. For example, a given input could be transcribed by a computing device by generating a string corresponding to the input. Transcription methods include the first transcription (such as phonetic, radical, image (handwriting), audio (speech) transcripts), which associate with well-defined and mapped meaningful ideographic symbol (second transcription). Any of above transcription mapping methods can be developed as an input method. Users can input the first transcription into a special input method program to produce a second transcription. For instance, pinyin input method is one of most popular input methods for generating Chinese characters using a traditional Latin keyboard.

For Mandarin Chinese, for example, pinyin is a phonetic system for transcribing the sound of Chinese characters into Romanized script. Pinyin enables a user to identify a Chinese character by the phonetic pronunciation of the Chinese character, whose sound is described by the transcribed Romanized script. A pinyin-based input method editor allows users input Romanized characters to generate Chinese characters. Generally, numerous input method editors may exist, and a user may install multiple distinct input method editors for Chinese input.

SUMMARY

According to one embodiment of the present invention, a first input is received to be transcribed using a first input method editor (IME) of a plurality of IMEs. Next, a first transcription is determined for the first input using the first IME. Upon receiving an indication that the first transcription is incorrect, a second IME of the plurality of IMEs is selected based on a mapping between a context of the first input and the second IME, wherein the context of the first input comprises a first application that the first input was intended for, the first input, and a series of transcriptions that were determined just before receiving the first input. Finally, a second transcription is determined for a second input using the second IME.

DETAILED DESCRIPTION

Figure 1:
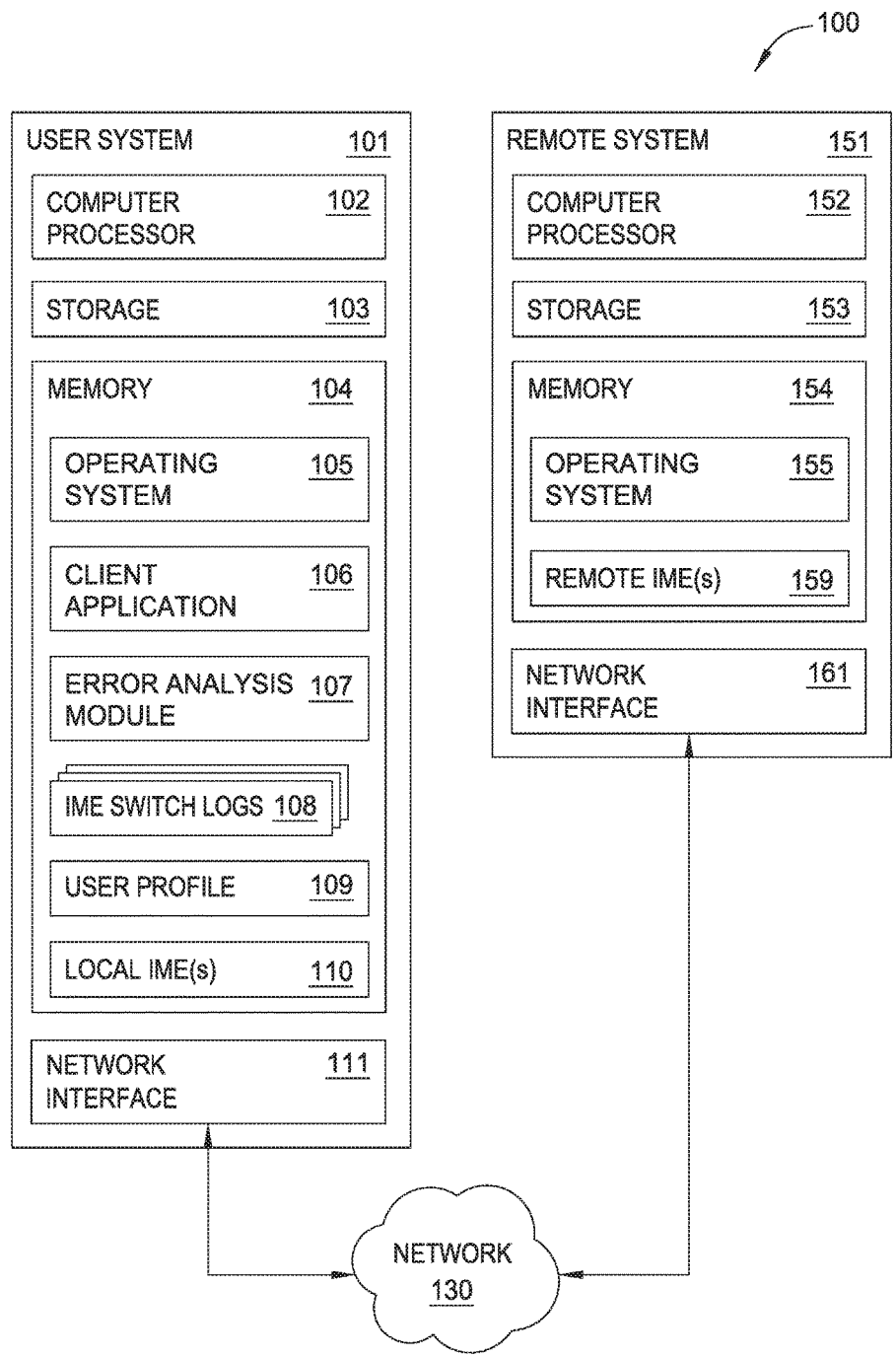
FIG. 1 is a block diagram illustrating a system configured with an error analysis module, according to one embodiment described herein.

Input method editors (IMEs) are programs or applications that enable users to input complex characters to a computing system even when the desired character does not have a corresponding key on the user interface. For example, Chinese, Japanese, Korean, Vietnamese (CJKV), and many other complex languages each contain many thousands of unique characters, and it is not feasible to provide a dedicated key for each character. Users who wish to input such complex characters, therefore, must rely on one or more IMEs to transcribe some other kind of input into the desired characters. There are a large number of IMEs today, many relying on QWERTY keyboards, audio input, handwriting analysis, or some other form of input. As is discussed briefly below, each type of IME has advantages and disadvantages, so most users routinely utilize multiple IMEs on a single device, and switch between them frequently in order to facilitate transcription. This manual IME switching is time-consuming and frustrating, and an automated process for selecting a more advantageous IME is desired.

One popular type of IME is a handwriting IME that uses handwriting recognition to transcribe a user's input to the corresponding character(s). These handwriting IMEs may scan writing that a user has previously written, but more frequently they provide a space for the user to write directly on an input section of a device and the input is transcribed in real time. This input section may be a portion of a touch screen, a dedicated device used only for handwriting input, or any other suitable method of inputting handwriting. Handwriting IMEs are convenient in that they often require no extra hardware that the user does not already possess, and they are relatively quick, especially if the user has a stylus. Unfortunately, handwriting IMEs can be difficult to use as well. If a particular user's handwriting is sloppy or has unique quirks, many handwriting IMEs will struggle to provide a correct transcription. Similarly, handwriting IMEs can be difficult to use if the user is moving or being jostled, for instance on a bus or train. Often, a handwriting IME will work well for many characters but will frequently fail to provide an accurate transcription for more complex characters. Thus, users frequently switch to another type of IME when they know they need to input a character that the handwriting IME cannot recognize.

Another popular type of IME is an audio IME. Audio IMEs use a microphone to receive verbal input from a user, and transcribe the spoken speech into text. Speech recognition is useful to quickly transcribe input, but can also be undesirable to use. Using an audio IME requires the user to speak out loud, which can compromise privacy and annoy others if the user is in a public setting. Additionally, the speech recognition employed by audio IMEs may frequently fail to accurately transcribe input if the user has an accent. Similarly, audio IMEs are difficult to use if there is ambient noise in the area. As above, audio IMEs may frequently work well for some characters while repeatedly failing to recognize other characters or phrases, often because of accents and unique quirks of each user. Thus, users frequently switch between audio IMEs and other types of IMEs.

A third popular type of IME is a romanization IME that allows a user to input Latin characters (often English characters on a QWERTY keyboard or a T9-style keyboard) for transcription. One popular example is a pinyin IME for Chinese transcription, though similar IMEs exist for other languages as well. For purposes of brevity, these IMEs are described using pinyin IMEs as representative. Pinyin IMEs and other related IMEs rely on romanization of the target language. For example, the pinyin method of romanization is an established system of writing Chinese characters using the Roman (e.g., Latin or English) alphabet and frequently uses a standard QWERTY keyboard. Pinyin approximates the pronunciation of Chinese characters and phrases using English/Latin characters. For example, the Chinese character "照片" meaning "photograph" can be written as "zhào piàn" in pinyin. Pinyin IMEs are advantageous in that they require nothing more than a standard keyboard and input can be provided silently and relatively quickly.

A key disadvantage to such systems, however, is that the user must know how to accurately pronounce the desired character and know how to describe that pronunciation using Latin letters. Different individuals may frequently pronounce the same phrase or character quite differently, which leads to obvious problems using a pinyin IME. Additionally, many characters are pronounced very similarly, and it can be tedious to go through dozens of transcription suggestions to arrive at the desired character. In particular, one issue in the use of pinyin or phonemic based scripts, is the number of homonyms that may exist for the same Latinized or Romanized (hereafter referred to as Romanized or Romanization), script characters. Many phonetic input systems use a multiple-choice method to address this homonym issue, presenting a candidate list of possible characters with the same pronunciation for each syllable entered, for selection by a user. For example, the pronunciation of "yi" in Mandarin Chinese can correspond to over 100 Chinese characters, which would generate a large list of characters from which a user must choose the most appropriate for the intended use. For these reasons, many users switch from pinyin IMEs to other IMEs to transcribe particular phrases or characters.

Another popular option for users is a stroke IME that is based on the structure of the desired character. Often, the order of strokes that a user uses when writing the character by hand is used. Common Chinese stroke IMEs use five keys for entry, one key for each type of stroke. These IMEs are advantages in that they do not rely on pronunciation, but can be difficult to use, especially for characters with similar appearances. There are many other types of IMEs, and many different specific IMEs within each type. As is clear, users frequently desire to use multiple IMEs for input, switching manually between them frequently based on the character that they wish to enter.

Various IMEs can be provided to a user in a variety of ways. Some transcription can be provided locally on the user's device, but may also be provided as a service on a remote device, e.g., in the cloud. Frequently, IMEs are used on mobile devices such as cell phones, but they are also useful (and often required) for other devices, including a laptop, desktop computer, wearable device, or any other device which receives input from a user. A single user may have multiple IMEs for multiple languages, but users also frequently install multiple IMEs for a single language in order to facilitate transcription. Because each IME has advantages and disadvantages, users frequently switch to a different IME for the same target language manually for a single or few characters, only to switch back to their preferred IME immediately afterwards. Such manual switching is time-consuming and frustrating. Embodiments of the present disclosure generally utilize context-sensitive intelligent switching between IMEs based on prior manual IME switches, transcription errors, predefined rules, and user customization, even if the multiple IMEs provide transcription for a single target language.

FIG. 1 is a block diagram illustrating a system for intelligently switching IMEs, based on an embodiment of the present disclosure. As shown in FIG. 1, the system 100 includes a User System 101 and a Remote System 151 connected by a Network 130. In some embodiments, all transcription is performed locally and there is no need for a Remote System 151. In other embodiments, one or more of the IMEs that a user wishes to access are provided as a service on Remote Server 151. Generally, User System 101 may send input provided by a user over Network 130 to Remote System 151 where it is transcribed. The resulting transcription is then sent back over Network 130 to User System 101. As shown, User System 101 contains a Computer Processor 102, Storage media 103, Memory 104, and a Network Interface 111. Computer Processor 102 may be any processor capable of performing the functions described herein. The User System 101 may connect to the Network 130 using the Network Interface 111. Furthermore, as will be understood by one of ordinary skill in the art, any computer system capable of performing the functions described herein may be used.

In the pictured embodiment, Memory 104 contains an Operating System 105, a Client Application 106, an Error Analysis Module 107, a plurality of IME Switch Logs 108, a User Profile 109, and one or more Local IME(s) 110. Of course, in some embodiments all IMEs that the user accesses are located remotely and no Local IME(s) 109 are present. Although Memory 104 is shown as a single entity, Memory 104 may include one or more memory devices having blocks of memory associated with physical addresses, such as random access memory (RAM), read only memory (ROM), flash memory, or other types of volatile and/or non-volatile memory. The Operating System 105 may be any operating system capable of performing the functions described herein.

The Client Application 106 is any application requiring input from a user, where the user wishes to use an IME to provide said input. The Error Analysis Module 107 monitors manual IME switches and input from the user to Client Application 106, determines whether an IME switch is required, and switches to a second IME when required, as will be discussed in greater detail below. The Error Analysis Module 107 also records transcription errors in the IME Switch Logs 108, as will also be discussed in more detail below. Additionally, in some embodiments Error Analysis Module 107 also generates IME Switch Logs 108 when a user manually switches to a second IME, even when no transcription error was made. The IME Switch Logs 108 may include a reference to the IME that was selected by the user, the input that triggered the faulty transcription, the context of the input, a reference to the Client Application 106, and any other useful data as will be described in more detail below. The Local IME(s) 110 may be any IME capable of transcribing any type of user input, including an audio IME, pinyin IME, stroke IME, and handwriting IME. User Profile 109 generally contains information about user preferences and IME configurations, as will be discussed in more detail below.

The Remote System 151 contains a Computer Processor 152, Storage media 153, Memory 154, and a Network Interface 161. Computer Processor 152 may be any processor capable of performing the functions described herein. The Remote System 151 may connect to the Network 130 using the Network Interface 161. Furthermore, as will be understood by one of ordinary skill in the art, any computer system capable of performing the functions described herein may be used.

In the pictured embodiment, Memory 154 contains an Operating System 155 and one or more Remote IME(s) 159. Although Memory 154 is shown as a single entity, Memory 104 may include one or more memory devices having blocks of memory associated with physical addresses, such as random access memory (RAM), read only memory (ROM), flash memory, or other types of volatile and/or non-volatile memory. The Operating System 155 may be any operating system capable of performing the functions described herein. The Remote System 151 is generally configured to receive input from Network 130, transcribe the input using the one or more Remote IME(s) 159, and return the transcription back to the device that sent the input.

Figure 2:
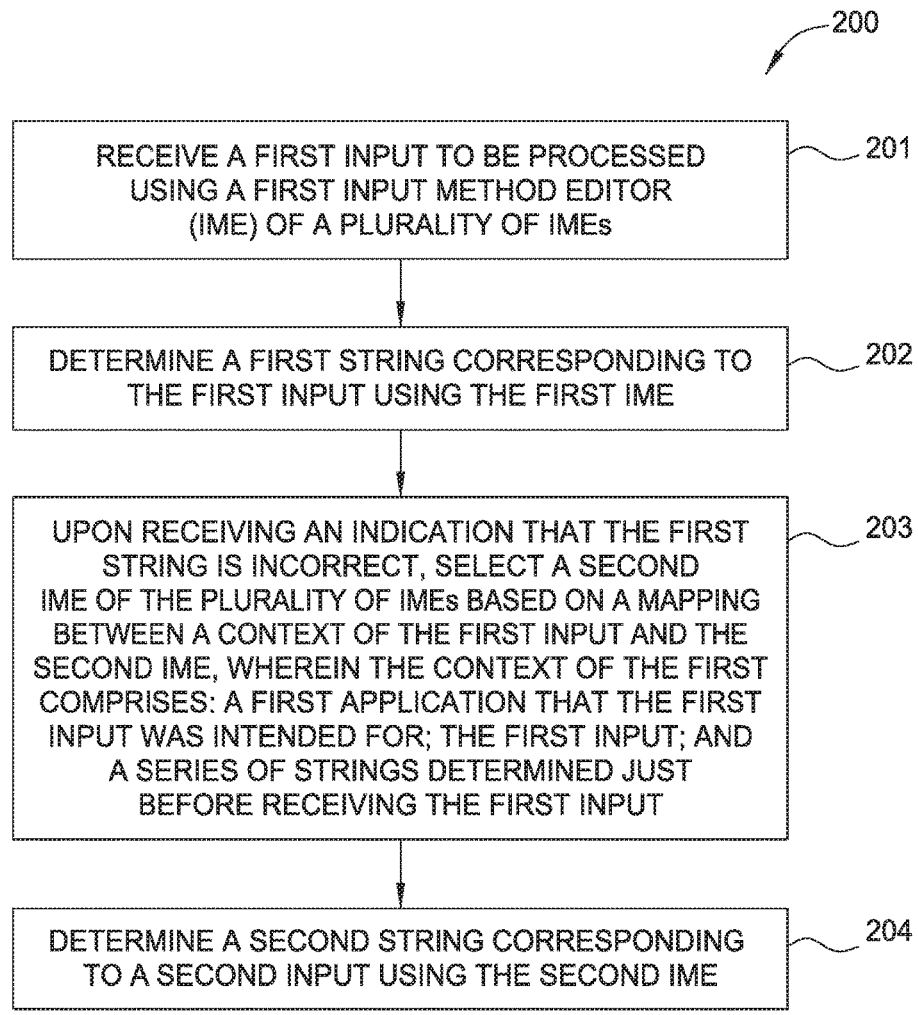
FIG. 2 is a flow diagram illustrating a method of proactively switching IMEs for transcribing user input, according to one embodiment described herein.

FIG. 2 illustrates a flow diagram for a method 200 of one embodiment of the present disclosure. The method 200 begins at block 201, where the system receives a first input to be processed using a first input method editor (IME) of a plurality of IMEs. Then, at block 202, the system determines a first string corresponding to the first input using the first IME. The method 200 next proceeds to block 203, where, upon receiving an indication that the first string is incorrect, the system, e.g., the Error Analysis Module 107, selects a second IME of the plurality of IMEs based on a mapping between a context of the first input and the second IME, wherein the context of the first input comprises: a first application that the first input was intended for; the first input; and a series of strings determined just before receiving the first input. Finally, the method 200 concludes at block 204, where the system determines a second string corresponding to a second input using the second IME.

Figure 3:
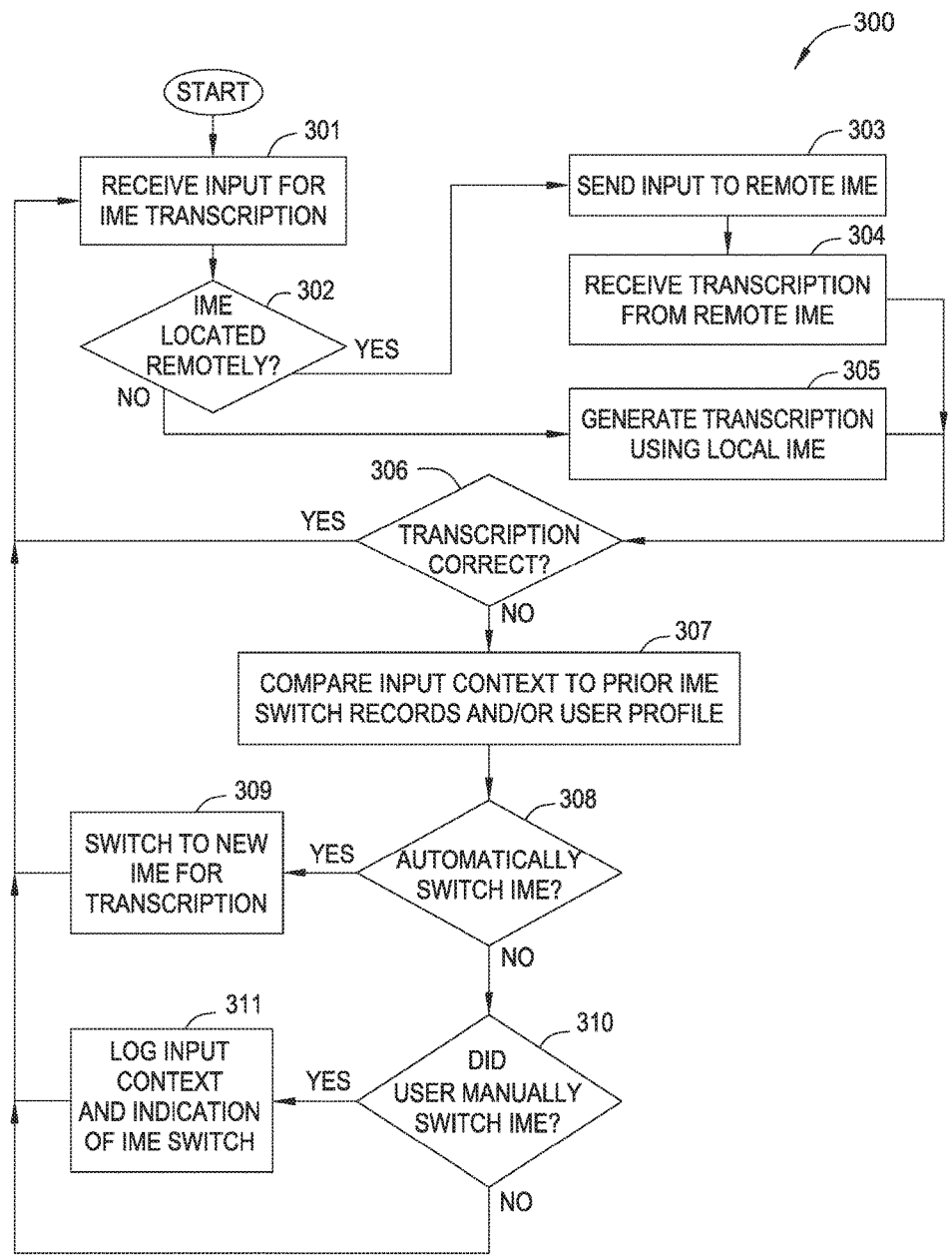
FIG. 3 is a flow chart illustrating a method of proactively switching IMEs for transcribing user input, according to one embodiment described herein.

FIG. 3 is a flow chart illustrating one embodiment of the present disclosure. As illustrated, FIG. 3 shows a method 300 for intelligent automatic IME switching based on context. The method 300 begins at block 301, where the system receives input from a user. The input is to be transcribed using an IME, and may be audio, a handwriting image, text, a series of strokes, or any other appropriate input that can be transcribed. At block 302, the system optionally determines whether the desired IME is located locally or on a remote system, e.g. Remote System 151. As discussed herein, a particular IME may be executed entirely on a user's local device, entirely on a remote server, e.g., in the cloud, or may be split between local and remote execution. As FIG. 3 illustrates, if the desired IME service is provided on a remote system, the input is sent to the remote system at block 303. The remote system may be communicatively coupled to the local system in any manner sufficient to perform the functions disclosed herein. Additionally, the remote IME service may in fact be located on the same device as the local system, e.g., in another virtual machine on the same physical device. At block 304, the local system receives a suggested transcription from the remote system, and proceeds with the method 300.

Alternatively, if the system determines at block 302 that the desired transcription can be executed locally, the method 300 proceeds to block 305 where a suggested transcription is generated based on the input using the local IME. As illustrated, the method 300 proceeds to block 306 where the system determines whether the suggested transcription is correct. In some embodiments, Error Analysis Module 107 is configured to make the determination regarding the correctness of the transcription. In an embodiment, the suggested transcription is provided to the inputting user and the user may manually or verbally confirm the transcription as correct or discard the transcription as incorrect. Additionally or alternatively, the system or Error Analysis Module 107 may be configured to detect that a user confirmed a transcription but immediately deleted it after inserting it. This may indicate that the transcription was not correct, but the user accidentally or intentionally inserted it only to delete it and switch to a different IME for entering the correct character. If the transcription was correct, the method 300 returns to block 301 where the user provides input for further transcription. Alternatively, if the system or Error Analysis Module 107 determines that the transcription was incorrect, the method 300 proceeds to block 307.

At block 307, the Error Analysis Module 107 compares the context of the input to prior IME switching records and/or user profiles. In some embodiments, the input context and prior IME switch records include the correct transcriptions that were entered just before the input which led to the incorrect transcription. For example, the Error Analysis Module 107 may be configured to determine whether a series of characters entered just before the current error corresponds to a series of characters leading up to a prior error and manual switch. In another embodiment, the input context includes the input itself, and the Error Analysis Module 107 compares the input that led to the current failed transcription to prior input. For example, the Error Analysis Module 107 may be configured to determine that a handwriting image is similar to some previous handwriting image that is stored in a prior IME switch record. In another embodiment, the input context includes the application that the user is interacting with when the transcription error occurs. For example, the Error Analysis Module 107 may be configured to compare the current context to prior IME switches that occurred when using the same application as the current input.

In some embodiments, the user can select what is and is not stored in the prior IME switch records and compared to the present input context. For example, a user may not care whether the application being used is the same, or may want error records from other applications to be used, but with a discounted weight. Alternatively, a user may be uncomfortable with storing the transcriptions leading up to prior errors due to privacy concerns, and may configure the system to only consider the current input itself. These preferences can be stored in a configurable user profile, and can be taken into account by Error Analysis Module 107 at block 307. In some embodiments, the user profile may also contain information about preferred or default IMEs for the user. The default IME may be specific to each application, or may be the same across the entire device. In another embodiment, the user profile includes a second IME that is preferred if a switch is required. For example, a user may indicate that their preferred or default IME is a handwriting IME, but that if a switch is required, it is preferred to switch to a stroke IME. Additionally, in some embodiments the user may indicate that the system should never switch to a different IME when certain applications are being used.

At block 308, after comparing the input context to prior IME switches, the Error Analysis Module 107 determines whether or not to switch to a second IME. If the Error Analysis Module 107 determines that another IME is better suited to transcribe the input, e.g., because the input context is similar to at least one prior IME switch, the method 300 proceeds to block 309 where the new IME is selected for future transcriptions. In some embodiments, the switch is accomplished by updating a pointer which points to the IME that is to be used for a given input. For example, the IME pointer may indicate a section of disk space or a location on a network where the IME service is located, and block 309 may comprise updating that pointer to point to a different section. After switching to a second IME, the method 300 returns to block 301, where the user may attempt to enter the desired character again.

In some embodiments, the Error Analysis Module 107 is configured to immediately switch back to the first IME after the user enters the desired character. For example, a user may indicate that the suggested transcription is wrong when using a handwriting IME. The Error Analysis Module 107, in response, may automatically switch to an audio IME. In some embodiments, the system continues to use the audio IME until the user switches back manually, or until another incorrect transcription occurs. In some embodiments, however, the Error Analysis Module 107 is configured to use the audio IME only for transcription of a single character or a small number of characters. The Error Analysis Module 107 may then automatically switch back to the original IME so that the user may continue entering characters using their preferred IME.

In some embodiments, the Error Analysis Module 107 is configured to continue to monitor the user's actions even after determining at block 308 to switch to a different IME. For example, if, after the automatic switch, the user does not enter new input but instead manually switches back to the first IME, the Error Analysis Module 107 may be configured to record an indication of that as well. Additionally or alternatively, the Error Analysis Module 107 may be configured to weaken the mapping that led to the automatic switch. For example, the Error Analysis Module 107 may be less likely to make the same automatic switch based on the same context in the future, because the user was not pleased with the result. In this way, the Error Analysis Module 107 evolves and learns from the user's patterns and provides intelligent switching decisions based on the context of the input and the user's preferences.

If, at block 308, the Error Analysis Module 107 decides not to switch IMEs, e.g., because the input context is not similar to any prior IME switch records, the method 300 proceeds to block 310 where the Error Analysis Module 107 monitors the system to determine whether the user has manually switched to a second IME in response to the failed transcription. If the user goes on to provide input for transcription and does not switch to a second IME, the method 300 returns to block 301. For example, the transcription may have been inaccurate because of loud background noises, mistyping by the user, or any other reason other than inadequacy of the IME. Alternatively, if the user manually switches to a second IME, the method 300 proceeds to block 311. At block 311, the Error Analysis Module 107 creates a record which logs the context of the failed input, as well as an indication of the IME that the user selected. As discussed above, the input context may include a variety of information. In some embodiments, the input context includes the transcribed characters that led up to the failed transcription. In another embodiment, the input context includes the input itself that was improperly transcribed. In yet another embodiment, the input context includes the input provided by the user which was properly transcribed, as well as the resulting transcriptions. In some embodiments, the context includes the application that the input was intended for. Additionally, in some embodiments the input context includes a reference to the IME that provided the incorrect transcription.

In some embodiments, the input context also includes information about what the user did after the manual IME switch. For example, the log may include the transcribed character or characters that were entered just after the switch. Additionally, the log may include an indication that the user entered a single character or a small number of characters, and then switched back to the original IME. In some embodiments, this additional information enables the Error Analysis Module 107 to intelligently switch to a second IME upon determining that the first IME is incapable of correct transcription, and then determine when to return to the first IME based on learning from the user's patterns. After logging the context of the failed input and the IME switch, the method 300 returns to 301 to allow the user to continue to input information to be transcribed using the selected IME. In this way, the Error Analysis Module 107 will be better suited to intelligently switch IMEs for future transcriptions.

Figure 4:
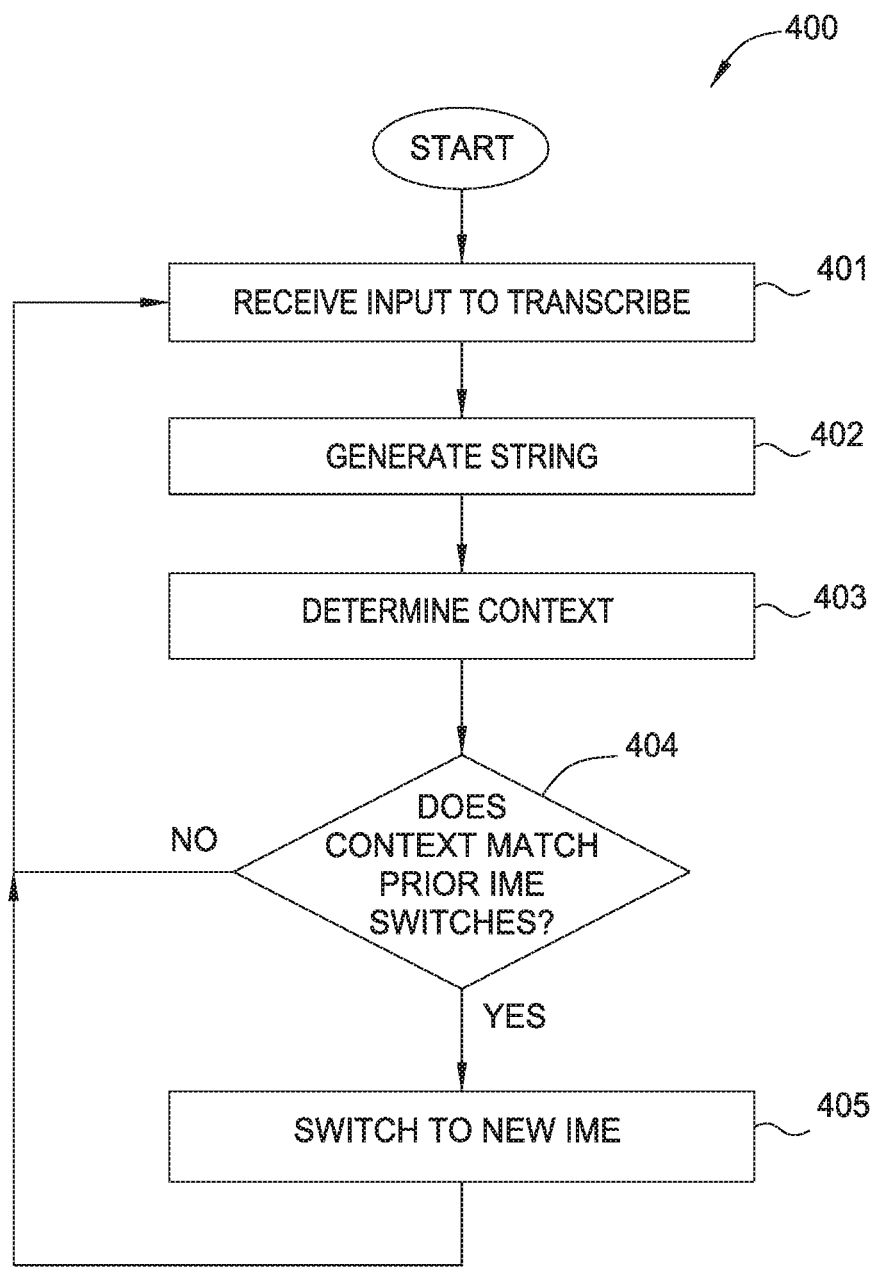
FIG. 4 is a flow chart illustrating a method of predictively switching IMEs to transcribe future user input, according to one embodiment of the present disclosure.

FIG. 4 illustrates a flow chart for a method 400 implementing another embodiment of the present disclosure. The method 400 begins at block 401, where the system receives input from a user. At block 402, the system generates a string based on the received input and provides the string to the user. Block 402 broadly represents the transcription process illustrated in FIG. 3, but the method illustrated in FIG. 4 applies only when the suggested string is correct and the user confirms its entry. The illustrated embodiment of FIG. 4 departs from the above discussed embodiments at block 403. At block 403, rather than simply returning to block 401 to receive input from the user, the Error Analysis Module 107 determines a context of the provided string. In some embodiments, the context includes the generated string itself. In other embodiments, the context also includes previously generated strings that led up to the current correct string. Additionally, in some embodiments, the context includes the application that the transcriptions are being generated for. The context may also include a reference to the IME that was used for each of the immediately preceding generated strings, as well as for the current correct string.

At block 404, the Error Analysis Module 107 determines whether the current context is similar to or corresponds to prior IME switch records. The IME switch records contain logs of previous IME switches and the associated context. For example, as discussed above, the Error Analysis Module 107 could determine whether the sequence of strings or inputs of the current situation are similar to the sequence of strings that immediately preceded an IME switch in the past. Additionally or alternatively, the Error Analysis Module 107 may be configured to compare the application being used, the IME being used before the switch, and any other context disclosed herein. If the Error Analysis Module 107 determines that switching IMEs would be inappropriate, the method 400 returns to block 401 to receive input from the user. This determination may be made, for example, because no prior IME switches match the current context. In some embodiments, the current context may be similar to one or more prior switches, but the Error Analysis Module 107 may determine that a switch would be inappropriate for other reasons. For example, the Error Analysis Module 107 may determine that the current context occurs frequently and only rarely does the user intend to switch to a different IME for the next input.

Alternatively, the Error Analysis Module 107 may determine, at block 404, that the IME should be switched based on the current context and the context of prior IME switches. For example, a user may repeatedly enter a series of characters such as a place, a name, or a phrase, and then switch manually to another IME because the next character to be entered will likely be difficult with the current IME. This pattern can recur frequently, with the Error Analysis Module 107 logging each switch. Additionally or alternatively, as discussed above, the Error Analysis Module 107 may automatically switch to a second IME based on receiving an indication that the suggested transcription is incorrect. Each of these automatic switches may also generate an IME switch record. Based on these records, at block 404 the Error Analysis Module 107 may determine that the user will likely want to switch to a different IME for the next character. If so, the method 400 proceeds to block 405 where the Error Analysis Module 107 automatically switches to the second IME. As discussed above, this switch could be accomplished through updating a pointer to the current IME, or any other appropriate method to achieve the functions disclosed herein.

In the illustrated embodiment of FIG. 4, the Error Analysis Module 107 intelligently switches to a second IME before a transcription error is even made, based on recognizing a pattern of switches in the past. As discussed above, the Error Analysis Module 107 may further automatically switch back to the first IME after the next character is inputted, again based on the historic records and context. This enables the system to seamlessly transcribe input from the user using multiple IMEs, switching back and forth between them as needed, with minimal user intervention.

In some embodiments, the Error Analysis Module 107 can determine that the sequence of generated strings or inputs of the current situation constitutes an invalid sequence of transcriptions in the current IME but also identify a different IME for which the sequence constitutes a valid sequence of transcriptions. Determinations of what constitutes a valid or invalid sequence of transcriptions of a particular IME can be based on a predefined set of validity rules that are specific to the particular IME. In instances where a different, intended IME is unambiguously identified (e.g., where the sequence is valid only for a single one of the available IMEs and invalid for all the others), the Error Analysis Module 107 may switch to the identified IME in a manner that retroactively accepts the sequence as input—even absent past IME switches as guidance. Depending on the embodiment, such an IME switch may occur with or without triggering a formal error in the current IME. Doing so relieves the user from having to manually switch to the different IME and reenter the sequence of transcriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., one or more IME transcription services) or related data available in the cloud. Additionally, the proactive IME switching application could available in the cloud. For example, the Error Analysis Module 107 could execute on a computing system in the cloud and intelligently switch which IME service should be provided to a user. In such a case, the Error Analysis Module 107 could determine which IME is appropriate to use for a given input and store IME switch logs at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method of preemptive input method editor (IME) switching, the computer-implemented method comprising:

receiving a first input to be processed using a first IME of a plurality of IMEs for a single language, wherein each of the plurality of IMEs is configured to map input data of a respective data type to corresponding characters in a respective, predefined manner;

generating a first string of one or more characters by mapping the first input to the first string in the predefined manner according to the first IME;

upon determining that in at least one prior instance, the first string preceded a second string of one or more characters subsequently rejected by the user and after which the user indicated to switch from the first IME to a second IME of the plurality of IMEs, automatically switching, by operation of one or more computer processors, from the first IME to the second IME prior to receiving any input corresponding to the second string; and generating a third string by mapping a second input to the third string in the predefined manner according to the second IME, wherein the first and third strings are provided as input to one or more applications.

2. The computer-implemented method of claim 1, wherein the second IME is selected based on a plurality of error records, wherein each of the plurality of error records was generated in response to a respective error, wherein each of the plurality of error records comprises:
 a prior input that led to the respective error;
 a reference to a prior IME, wherein the prior IME and the first IME are different; and
 a reference to a prior application that the prior input was intended for.

3. The computer-implemented method of claim 1, wherein the second IME is selected based on a plurality of predefined rules, wherein the predefined rules comprise:
 a preferred IME for the first application; and
 a preferred IME to switch to if using the first IME yields an incorrect string.

4. The computer-implemented method of claim 1, wherein the first input comprises one of:
 audio for use with an audio IME;
 one or more Latin alphabet characters;
 one or more strokes for use with a stroke IME; and
 handwritten input for use with a handwriting IME.

5. The computer-implemented method of claim 1, wherein the first input is distinct from the second input, wherein the predefined manner according to the first IME is distinct from the predefined manner according to the second IME.

6. The computer-implemented method of claim 5, wherein the single language is one of: Chinese, Japanese, Korean, and Vietnamese.

7. The computer-implemented method of claim 1, further comprising:
 upon determining that in one or more prior instances, the user indicated to switch from the first IME to the second IME just prior to the third string being generated and further indicated to switch from the second IME back to the first IME just subsequent to the third string being generated, automatically switching from the second IME back to the first IME subsequent to generating the third string; and
 generating a fourth string by mapping a third input to the fourth string in the predefined manner according to the first IME, wherein each of the first, third, and fourth strings, upon acceptance by the user, is submitted to input to the one or more applications.

8. The computer-implemented method of claim 7, wherein the third string is distinct from the second string, wherein each of the plurality of IMEs is of a distinct IME type, wherein the first string immediately preceded the second string in the previous instance, wherein the second string is not provided as input to any of the one or more applications;
 wherein the second IME is automatically selected based on a mapping between a context of the first input and the second IME, wherein the context of the first input comprises: (i) a first application, of the one or more applications, that the first input was intended for; (ii) the first input; and a series of strings determined just before receiving the first input.

9. The computer-implemented method of claim 8, wherein the second IME is automatically selected based further on a plurality of error records, wherein each of the plurality of error records was generated in response to a respective error, and wherein each of the plurality of error records comprises:
 a prior input that led to the respective error;
 a reference to a prior IME, wherein the prior IME and the first IME are different; and
 a reference to a prior application that the prior input was intended for.

10. The computer-implemented method of claim 9, wherein the second IME is automatically selected based still further on a plurality of predefined rules, wherein the predefined rules comprise:
 a preferred IME for the first application; and
 a preferred IME to switch to if using the first IME yields an incorrect string;
 wherein the first and second inputs comprise two distinct input types selected from: (i) audio for use with an audio IME; (ii) one or more Latin alphabet characters; (iii) one or more strokes for use with a stroke IME; and (iv) handwritten input for use with a handwriting IME.

11. The computer-implemented method of claim 10, further comprising:
 receiving a third input using a third IME of the plurality of IMEs;
 determining a fourth string corresponding to the third input and according to the third IME;
 determining that a context of the third input matches a context of each of a plurality of historical IME switches, wherein the context of the third input comprises a series of inputs that were received leading up to the third input, wherein the context of each of the plurality of historical IME switches comprises a series of inputs that were provided leading up to the respective historical IME switch;
 selecting a fourth IME of the plurality of IMEs based on determining that the context of the third input matches the context of each of the plurality of historical IME switches; and
 determining a fifth string corresponding to a fourth input and according to the fourth IME.

12. The computer-implemented method of claim 11, wherein the computer-implemented method is performed by an IME manager, wherein the third string is determined by: sending second input to a remote server that provides the second IME as a service and receiving the second string from the remote server, wherein each error record further includes, for each application, a respective, distinct weight representing a measure of influence that user-directed IME switching in the respective application is to have on automatic IME switching of the IME manager;
 wherein the first input is distinct from the second input, wherein the predefined manner according to the first IME is distinct from the predefined manner according to the second IME, wherein the same language is, in respective instances, Chinese, Japanese, Korean, and Vietnamese.

13. The computer-implemented method of claim 1, wherein the third string is determined by:
 sending the second input to a remote server that provides the second IME as a service; and
 receiving the third string from the remote server.

14. A system of preemptive input method editor (IME) switching, the system comprising:
   one or more computer processors; and
   a memory containing a program executable by the one or more computer processors to perform an operation comprising:
      receiving a first input to be processed using a first IME of a plurality of IMEs for a single language, wherein each of the plurality of IMEs is configured to map input data of a respective data type to corresponding characters in a respective, predefined manner;
      generating a first string of one or more characters by mapping the first input to the first string in the predefined manner according to the first IME;
      upon determining that in at least one prior instance, the first string preceded a second string of one or more characters subsequently rejected by the user and after which the user indicated to switch from the first IME to a second IME of the plurality of IMEs, automatically switching from the first IME to the second IME prior to receiving any input corresponding to the second string; and
      generating a third string by mapping a second input to the third string in the predefined manner according to the second IME, wherein the first and third strings are provided as input to one or more applications.

15. The system of claim 14, wherein the second IME is selected based on a plurality of error records, wherein each of the plurality of error records was generated in response to a respective error, wherein each of the plurality of error records comprises:
   a prior input that led to the respective error;
   a reference to a prior IME, wherein the prior IME and the first IME are different; and
   a reference to a prior application that the prior input was intended for.

16. The system of claim 14, wherein the second IME is selected based on a plurality of predefined rules, wherein the predefined rules comprise:
   a preferred IME for the first application; and
   a preferred IME to switch to if using the first IME yields an incorrect string.

17. A computer program product of preemptive input method editor (IME) switching, the computer program product comprising:
   a computer-readable storage medium having computer-readable program code embodied therewith, the computer-readable program code executable by one or more computer processors to perform an operation comprising:
      receiving a first input to be processed using a first IME of a plurality of IMEs for a single language, wherein each of the plurality of IMEs is configured to map input data of a respective data type to corresponding characters in a respective, predefined manner;
      generating a first string of one or more characters by mapping the first input to the first string in the predefined manner according to the first IME;
      upon determining that in at least one prior instance, the first string preceded a second string of one or more characters subsequently rejected by the user and after which the user indicated to switch from the first IME to a second IME of the plurality of IMEs, automatically switching from the first IME to the second IME prior to receiving any input corresponding to the second string; and
      generating a third string by mapping a second input to the third string in the predefined manner according to the second IME, wherein the first and third strings are provided as input to one or more applications.

18. The computer program product of claim 17, wherein the second IME is selected based on a plurality of error records, wherein each of the plurality of error records was generated in response to a respective error, wherein each of the plurality of error records comprises:
   a prior input that led to the respective error;
   a reference to a prior IME, wherein the prior IME and the first IME are different; and
   a reference to a prior application that the prior input was intended for.

19. The computer program product of claim 17, wherein the second IME is selected based on a plurality of predefined rules, wherein the predefined rules comprise:
   a preferred IME for the first application; and
   a preferred IME to switch to if using the first IME yields an incorrect string.

20. The computer program product of claim 17, wherein the third string is determined by:
   sending the second input to a remote server that provides the second IME as a service; and
   receiving the third string from the remote server.

* * * * *